(12) United States Patent
Shumaker

(10) Patent No.: US 11,235,710 B1
(45) Date of Patent: Feb. 1, 2022

(54) DISPLAY BRACKET AND MOUNT APPARATUS AND METHODS OF USING THE SAME

(71) Applicant: Matthew Shumaker, Island Lake, IL (US)

(72) Inventor: Matthew Shumaker, Island Lake, IL (US)

(*) Notice: Subject to any disclaimer, the term of this patent is extended or adjusted under 35 U.S.C. 154(b) by 0 days.

(21) Appl. No.: 17/367,740

(22) Filed: Jul. 6, 2021

(51) Int. Cl.
| B60R 11/02 | (2006.01) |
| H04N 5/64 | (2006.01) |
| B60K 37/04 | (2006.01) |
| B60R 11/00 | (2006.01) |

(52) U.S. Cl.
CPC ......... B60R 11/0235 (2013.01); B60K 37/04 (2013.01); H04N 5/64 (2013.01); *B60K 2370/816* (2019.05); *B60R 2011/0005* (2013.01)

(58) Field of Classification Search
CPC ......... B60R 2011/0085; B60R 11/0235; B60R 2011/0005; B60K 37/04; B60K 2370/816; H04N 5/64
USPC ...................................................... 296/37.12
See application file for complete search history.

(56) References Cited

U.S. PATENT DOCUMENTS

| | | | | |
|---|---|---|---|---|
| 6,244,553 B1* | 6/2001 | Wang | ...................... | B60R 11/02 248/278.1 |
| 8,025,015 B1* | 9/2011 | Kennedy, Sr. | ......... | F16M 13/02 108/44 |
| 8,937,765 B2* | 1/2015 | Hopf | ................... | B60R 11/0235 359/443 |
| 9,132,788 B2* | 9/2015 | Karsch | ............... | B60R 11/0235 |
| 9,415,727 B2* | 8/2016 | Koseki | ............... | B60R 11/0235 |
| 9,752,722 B2* | 9/2017 | Fames | .................... | E05D 3/022 |
| 10,086,770 B2* | 10/2018 | Sundy | .................... | F16M 13/02 |
| 10,730,448 B2* | 8/2020 | Amano | ............... | B60R 11/0235 |
| 2013/0327912 A1* | 12/2013 | Yoshida | ................. | H04R 1/026 248/289.11 |
| 2014/0246468 A1* | 9/2014 | Montgomery | ...... | B60R 11/0229 224/548 |
| 2015/0343964 A1* | 12/2015 | Gatton | ............... | B62D 33/0612 296/190.02 |
| 2016/0176346 A1* | 6/2016 | Kiehl | .................... | H04N 5/2252 49/31 |
| 2019/0100156 A1* | 4/2019 | Chung | ................. | B60Q 1/0023 |
| 2020/0164811 A1* | 5/2020 | Carter | .................... | B60K 37/06 |

FOREIGN PATENT DOCUMENTS

| CA | 2505344 A1 * | 10/2006 | ......... B60R 11/0235 |
| DE | 10233890 A1 * | 4/2003 | ............ B60R 11/02 |

\* cited by examiner

*Primary Examiner* — Pinel E Romain
(74) *Attorney, Agent, or Firm* — Scherrer Patent & Trademark Law, P.C.; Stephen T. Scherrer; Monique A. Morneault

(57) ABSTRACT

A bracket and mount apparatus connects to a fixed touch-screen display of a Tesla vehicle allowing the same to rotate and/or tilt for placement where desired for viewing by either or both of a driver and a passenger thereof. Methods of using the same are further provided.

20 Claims, 3 Drawing Sheets

DISPLAY BRACKET AND MOUNT APPARATUS AND METHODS OF USING THE SAME

TECHNICAL FIELD

The present invention relates to a bracket and mount apparatus. Specifically, the bracket and mount apparatus connects to a fixed touchscreen display of a Tesla vehicle, allowing the same to rotate and/or tilt for placement where desired for viewing by either or both of a driver and a passenger thereof. Methods of using the same are further provided.

BACKGROUND

The Tesla Model 3 is an electric four-door fastback mid-size sedan developed by Tesla, Inc. that began production in mid-2017. Since early 2020, the Tesla Model 3 is the world's best-selling electric car in history, with more than 800,000 units delivered through December 2020. The Model 3 has been the world's top selling plug-in electric car for three years running, from 2018 to 2020. It has also been the best-selling plug-in car in the United States for three consecutive years, 2018 to 2020, the top selling plug-in car in Europe in 2019, and the best-selling plug-in car in China in 2020. In 2020, Tesla produced over 450,000 of the Model 3/Y chassis automobiles.

The Tesla Model 3 vehicle has a relatively large touchscreen display (15.4") that is mounted to the center of the dashboard of the vehicle, between the driver and passenger seats. The display is fixed in its position facing forward, thus not allowing a user to rotate or pivot the same so that the display is viewable by a driver and/or a passenger thereof.

The touchscreen display provides a driver and/or passenger much functionality, including displaying functions and status of the vehicle itself, browsing the internet, communication functionality (such as messaging), and even downloadable games. Thus, the display may be utilized by both the driver and the passenger.

Because the touchscreen display is fixed in a forward position and in a central location, the face of the screen is most easily accessible to neither the driver nor the passenger. Thus, when either the driver or the passenger utilizes the touchscreen display, he or she must often account for the awkward angle the display is positioned relative to each. Therefore, a driver must reach over across the display to touch icons and the like on the far side of the screen and presented at an oblique angle. Likewise, a passenger must do the same. In addition, simply viewing the screen requires the driver and/or passenger to align his or her head toward the center of the vehicle to obtain the proper viewing angle.

A need, therefore, exists for an improved mount and bracket apparatus for a center touchscreen display of a Tesla Model 3 vehicle. Specifically, a need exists for an improved mount and bracket apparatus that provides ease and convenience for either the driver and/or the passenger in using the same. Likewise, a need exists for an improved mount and bracket apparatus that allows for easy viewability of the touchscreen display to both and the driver and the passenger.

Moreover, a need exists for an improved mount and bracket apparatus that allows a user to rotate the screen and/or tilt the screen for better access thereto. Specifically, a need exists for an improved mount and bracket apparatus that provides the user the ability to manually rotate and/or tilt the display. More specifically, a need exists for an improved mount and bracket apparatus that holds the display in the desired position once moved.

SUMMARY OF THE INVENTION

The present invention relates to a bracket and mount apparatus. Specifically, the bracket and mount apparatus connects to a fixed touchscreen display of a Tesla vehicle, allowing the same to rotate and/or tilt for placement where desired for viewing by either or both of a driver and a passenger thereof. Methods of using the same are further provided.

To this end, in an embodiment of the present invention, a bracket and mount apparatus for a display for a vehicle is provided. The bracket and mount apparatus comprises: a first portion comprising a base element having a first gripper and a second gripper extending therefrom, the first gripper comprising a first central bore and the second gripper comprising a second central bore, and a first rod extending through the first and second central bores of the first and second grippers, respectively, the first rod comprising mounting surfaces configured to mount to a display of a vehicle, wherein the first rod forms a first axis of rotation when rotated within the first and second grippers; a second portion comprising an arm having a first terminal end configured to mount to a mounting element on a dashboard of a vehicle, the arm having a second terminal end comprising a flat mounting surface; and a second rod disposed through the base element and a first aperture within the flat mounting surface, wherein the second rod forms a second axis of rotation perpendicular to the first axis of rotation.

In an embodiment, the first rod comprises first and second bushings within the first and second central bores, respectively, within the first and second grippers, respectively.

In an embodiment, each of the first and second grippers comprises a slot and a tightening element disposed through the slot, wherein each of the first and second grippers are configured to become tighter or looser on the first rod via the tightening element.

In an embodiment, the rod has a first terminal end and a second terminal end, wherein on the first terminal end is a first flat mounting surface and on the second terminal end is a second flat mounting surface, wherein the first and second flat mounting surfaces on the rod are configured to contact a mounting tab extending from the display.

In an embodiment, the bracket and mount apparatus further comprises a cable holder configured to hold a cable extending from the display.

In an embodiment, the bracket and mount apparatus further comprises a second aperture disposed in the flat mounting surface of the arm.

In an embodiment, the first aperture is disposed on a first side of a center of the flat mounting surface of the arm, and the second aperture is disposed on a second side of the center of the flat mounting surface of the arm.

In an embodiment, the second rod is a bolt.

In an embodiment, the bolt comprises a nut, wherein a tension of rotation of the bolt is configured to be adjustable by loosening or tightening the nut on the bolt.

In an embodiment the bracket and mount apparatus further comprises a slidable washer disposed between the base element and the flat mounting surface of the arm.

In another embodiment of the present invention, a system for mounting a display to a dashboard of a Tesla vehicle is provided. The system comprises a vehicle; a display; and the bracket and mount apparatus disposed between the vehicle and the display.

In an embodiment, the display is attached to the first rod, wherein the display is configured to be tilted via rotation of the first rod within the first and second grippers.

In an embodiment, the vehicle is attached to the arm of the bracket and mount apparatus.

In another embodiment of the present invention, a method of using a bracket and mount apparatus for mounting a display to a vehicle is provided. The method comprises the steps of: providing a bracket and mount apparatus comprising: a first portion comprising a base element having a first gripper and a second gripper extending therefrom, the first gripper comprising a first central bore and the second gripper comprising a second central bore, and a first rod extending through the first and second central bores of the first and second grippers, respectively, the first rod comprising mounting surfaces configured to mount to a display of a vehicle, wherein the first rod forms a first axis of rotation when rotated within the first and second grippers; a second portion comprising an arm having a first terminal end configured to mount to a mounting element on a dashboard of a vehicle, the arm having a second terminal end comprising a flat mounting surface; and a second rod disposed through the base element and a first aperture within the flat mounting surface, wherein the second rod forms a second axis of rotation perpendicular to the first axis of rotation; mounting the bracket and mount apparatus to a dashboard of a vehicle; and mounting the bracket and mount apparatus to a display.

In an embodiment, the bracket and mount apparatus is attached to the dashboard of the vehicle by the arm.

In an embodiment, the bracket and mount apparatus is attached to the display by the first rod.

In an embodiment, each of the first and second grippers comprises a slot and a tightening element disposed through the slot, wherein each of the first and second grippers are configured to become tighter or looser on the first rod via the tightening element, wherein the display is tiltable via rotation of the first rod within the first and second grippers.

In an embodiment, the rod has a first terminal end and a second terminal end, wherein on the first terminal end is a first flat mounting surface and on the second terminal end is a second flat mounting surface, wherein the first and second flat mounting surfaces on the rod are attached to a mounting tab extending from the display.

In an embodiment, the flat mounting surface of the arm comprises a second aperture disposed in the flat mounting surface of the arm.

In an embodiment, the first aperture is disposed on a first side of a center of the flat mounting surface of the arm, and the second aperture is disposed on a second side of the center of the flat mounting surface of the arm, further comprising the steps of: removing the base element from the first aperture of the flat mounting surface of the arm; and connecting the base element to the second aperture of the flat mounting surface of the arm.

It is, therefore, an advantage and objective of the present invention to provide an improved mount and bracket apparatus for a center touchscreen display of a Tesla Model 3 vehicle.

Specifically, it is an advantage and objective of the present invention to provide an improved mount and bracket apparatus that provides ease and convenience for either the driver and/or the passenger in using the same.

Likewise, it is an advantage and objective of the present invention to provide an improved mount and bracket apparatus that allows for easy viewability of the touchscreen display to both and the driver and the passenger.

Moreover, it is an advantage and objective of the present invention to provide an improved mount and bracket apparatus that allows a user to rotate the screen and/or tilt the screen for better access thereto.

Specifically, it is an advantage and objective of the present invention to provide an improved mount and bracket apparatus that provides the user the ability to manually rotate and/or tilt the display.

More specifically, it is an advantage and objective of the present invention to provide an improved mount and bracket apparatus that holds the display in the desired position once moved.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to a bracket and mount apparatus. Specifically, the bracket and mount apparatus connects to a fixed touchscreen display of a Tesla vehicle, allowing the same to rotate and/or tilt for placement where desired for viewing by either or both of a driver and a passenger thereof. Methods of using the same are further provided.

Figure 1:
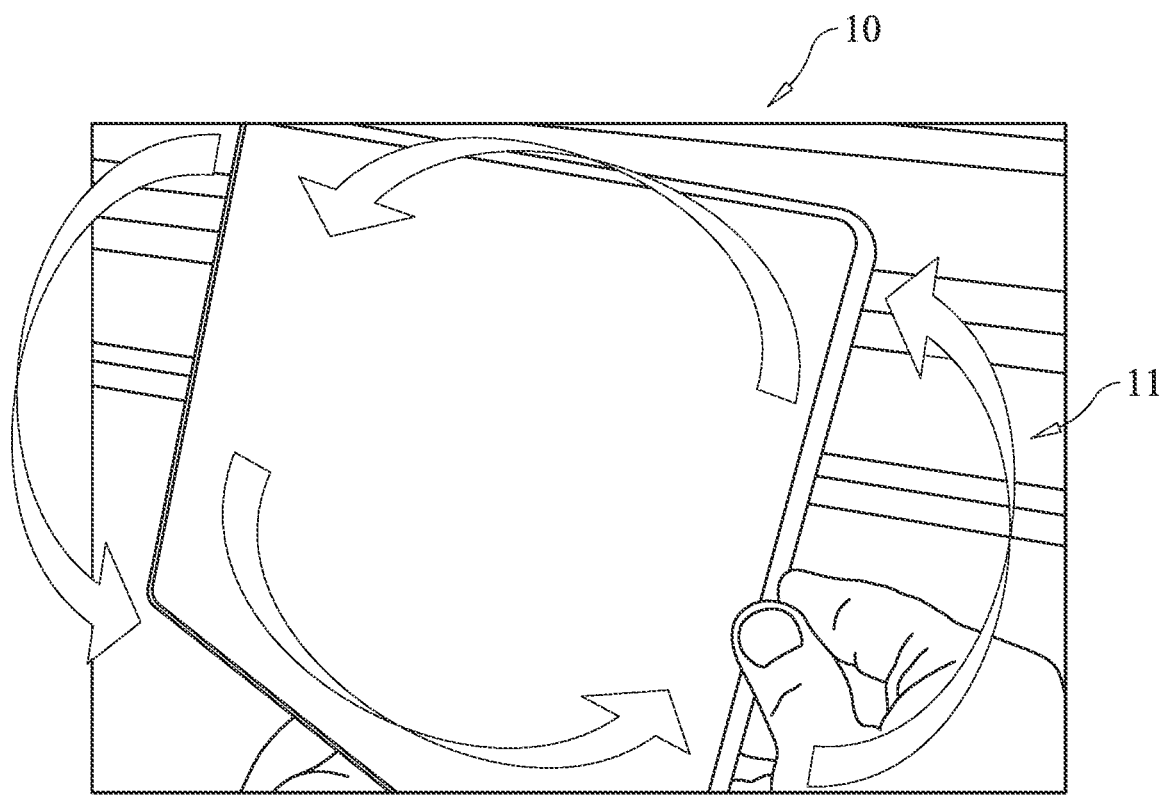
FIG. 1 illustrates a perspective view of a rotatable and tiltable touch screen display for a Tesla Model 3 in an embodiment of the present invention.
Figure 2:
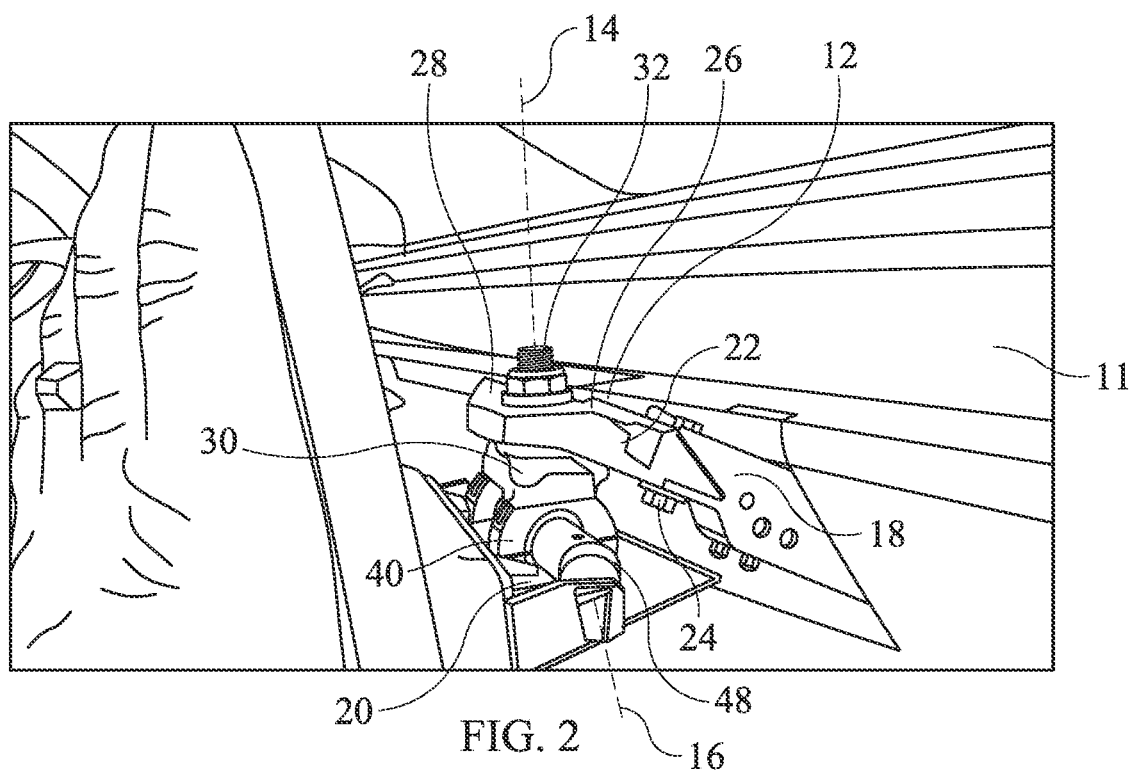
FIG. 2 illustrates a side view of a bracket and mount apparatus connected to a touch screen display in an embodiment of the present invention.
Figure 3:
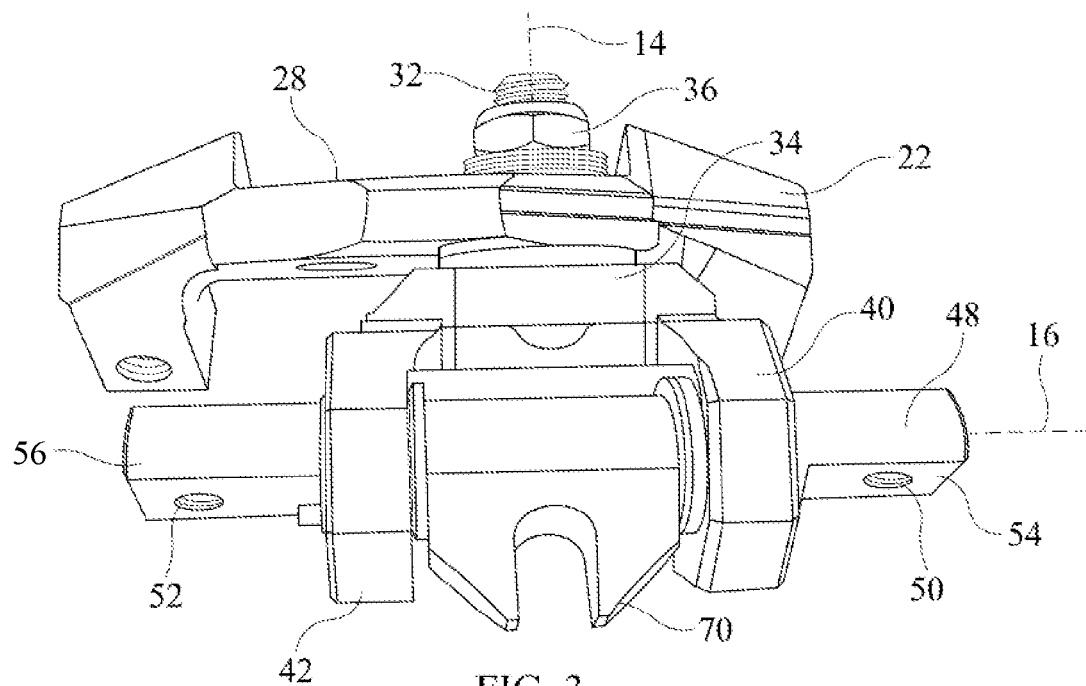
FIG. 3 illustrates a front view of a bracket and mount apparatus for a touch screen display in an embodiment of the present invention.
Figure 4:
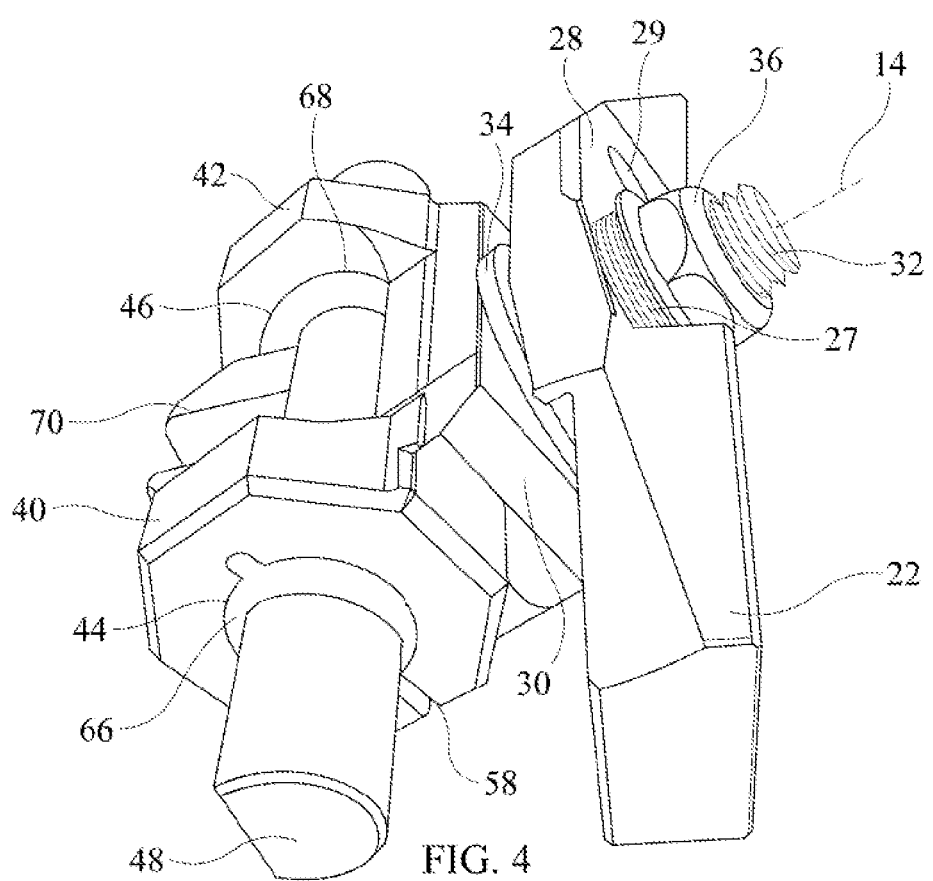
FIG. 4 illustrates a side perspective view of a bracket and mount apparatus for a touch screen display in an embodiment of the present invention.
Figure 5:
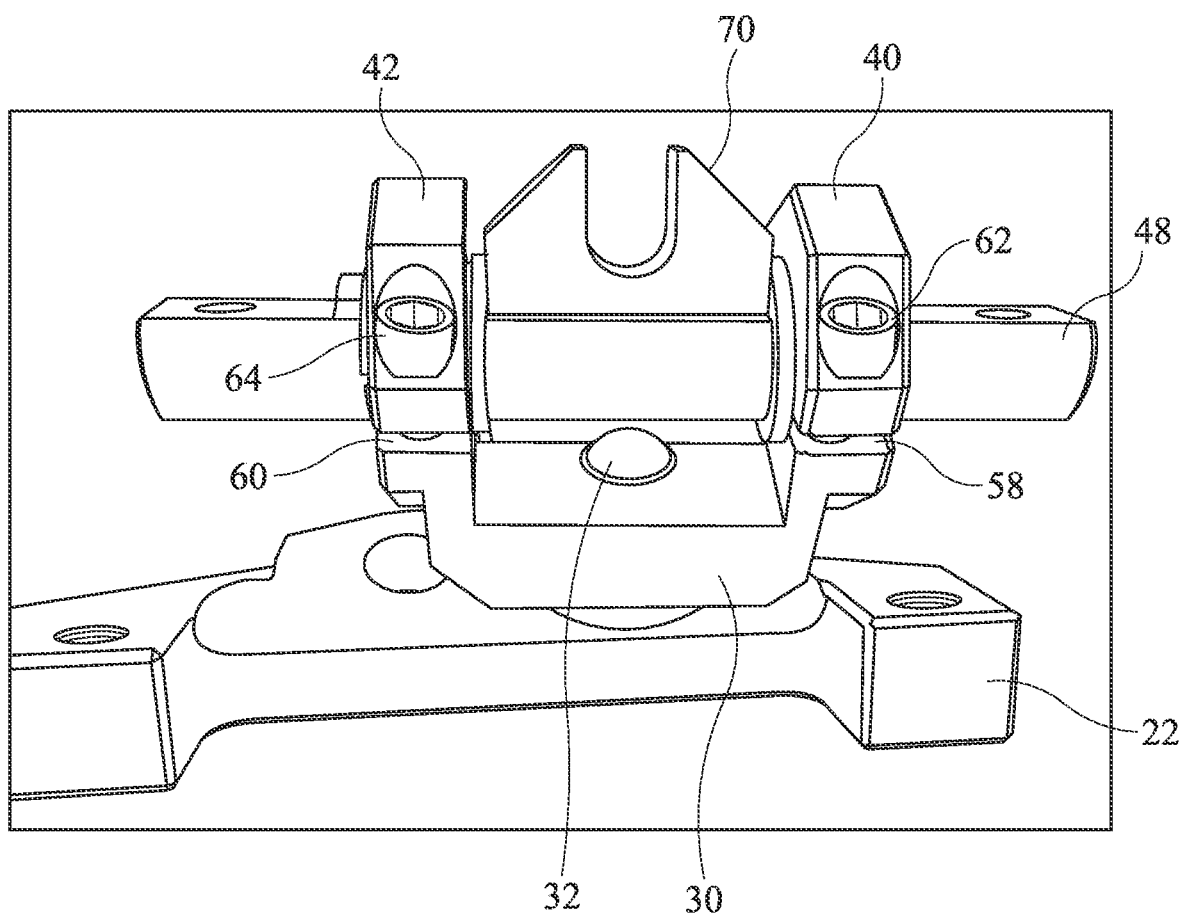
FIG. 5 illustrates a rear view of a bracket and mount apparatus for a touch screen display in an embodiment of the present invention.

Now referring to the figures, wherein like numerals refer to like parts, FIGS. 1 and 2 illustrate a rotatable and tiltable touch screen display 10 for a Tesla Model 3 vehicle that is mounted to a dashboard 11 thereof via a bracket and mount apparatus 12. As illustrated, the display 10 may rotate left to right around an axis 14. Likewise, the display 10 may tilt up and down about an axis 16. FIGS. 3-4 illustrate the bracket and mount apparatus 12 alone from various angles and not attached between the display 10 and the dashboard 11 of the Tesla Model 3 vehicle.

The Tesla Model 3 vehicle includes a mount element 18 extending therefrom to which the display 10 is normally mounted in a fixed and unmovable position. Thus, the display 10, having a mount tab 20, may be removed from the mount element 18 and the bracket and mount apparatus 12 may be placed therebetween, thereby allowing the display 10 to rotate and tilt as described above.

The bracket and mount apparatus 12 may include an arm 22 that, when mounted to the mount element 18, may extend from the mount element 18 and may be rigidly connected thereto, specifically via one or more bolts 24. The arm 22 may extend upwardly at an angle away from the mount element 18 and may further include a bend 26 and a flat portion 28 extending therefrom. Mounted beneath the flat portion 28 may be a base element 30 and a bolt 32 may extend through the base element 30 and the flat portion 28, thereby holding the base element 30 to the flat portion 28. The bolt may provide the axis of rotation 14, allowing the base element 30 to rotate relative to the flat portion 28. A neoprene washer 34 may be disposed between the base element 30 and the flat portion 28 to aid in rotating the base element 30 relative to the flat portion 28 and may further provide a smooth rotation without any elements binding together. A nut 36 disposed on the bolt 32 may be tightened or loosened to allow for looser or stiffer rotation of the base element 30 relative to the flat portion 28.

The flat portion 28 may have a first aperture 27 and a second aperture 29 through which the bolt 32 may optionally be disposed, depending on how close the user wishes the display to sit compared to other components of the vehicle, such as the steering wheel. Aperture 27 is disposed on one side of a center of the flat portion 28 and aperture 29 is disposed on a second side of the center of the flat portion 28, thereby allowing the bolt 32 to be placed in either, depending on the user's selection.

The base element 30 may further have grippers 40, 42 extending downwardly from the base element 30, the grippers 40, 42 having central bores 44, 46, respectively, therein. A rod 48 may extend through the central bores 44, 46, and may have bolt connection holes 50, 52 for attaching the rod 48 to the mounting tab 20 on the back of the display 10. Specifically, the rod 48 may have flattened portions 54, 56 on opposite ends thereof at the placement of the bolt connection holes 50, 52, thereby providing attachment surfaces to which the mounting tab 20 of the display 10 may be connected.

The grippers 40, 42 may be circular, octagonal, or any other shape that nearly completely surrounds the central bores 44, 46. Slots 58, 60 may be disposed in the grippers 40, 42 respectively, providing the means to adjust the gripping tension of each of the grippers 40, 42. Bolts 62, 64 may be disposed through the grippers 40, 42 at the location of the slots 58, 50 and may bridge the slots 58, 60 from one side of the slots 58, 60 to the other, respectively. Tightening the bolts 62, 64 may tighten the grippers 40, 42 around the rod 48; loosening the bolts 62, 64 may loosen the grippers 40, 42 around the rod 48. The rod 48 disposed through the grippers 40, 42 may allow the display 10 to tilt upwardly and downwardly and thus may form axis 16. Thus, the grip tension of the grippers 40, 42 may be adjusted, allowing for looser movement of the tilting of the display 10 or tighter movement of the tilting of the display 10. If tightened sufficiently, the bolts 62, 64 may lock the grippers 40, 42 about the rod 48 thereby preventing movement of the same.

Bushings 66, 68 may be disposed within the central bores 44, 46 that provide smoother rotation of the rod 48 within the central bores 44, 46, and may be made from plastic or any other material. A cable holding element 70 may be connected and extend downwardly from the rod 48, providing a guide and holder for the power and data cable extending from the rear of the display 10 and connected to the Tesla Model 3 vehicle.

The bracket and mount apparatus 12 has, therefore, the axis of rotation 14 allowing for rotation of the display 10 about the axis 14 and the axis of rotation 16 providing for rotation of the display 10 about the axis 16 for tilting the same. Moreover, the display 10 may be mounted either on one side of the center of the apparatus 12 or the other side of the center of the apparatus 14 depending on the user's selection. Thus, the display 10 may be rotated and/or tilted toward the driver, toward the passenger, or in any other location.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A bracket and mount apparatus for a display for a vehicle comprising:
    a first portion comprising a base element having a first gripper and a second gripper extending therefrom, the first gripper comprising a first central bore and the second gripper comprising a second central bore, and a first rod extending through the first and second central bores of the first and second grippers, respectively, the first rod comprising mounting surfaces configured to mount to a display of a vehicle, wherein the first rod forms a first axis of rotation when rotated within the first and second grippers;
    a second portion comprising an arm having a first terminal end configured to mount to a mounting element on a dashboard of a vehicle, the arm having a second terminal end comprising a flat mounting surface; and
    a second rod disposed through the base element and a first aperture within the flat mounting surface, wherein the second rod forms a second axis of rotation perpendicular to the first axis of rotation.

2. The bracket and mount apparatus of claim 1 wherein the first rod comprises first and second bushings within the first and second central bores, respectively, within the first and second grippers, respectively.

3. The bracket and mount apparatus of claim 1 wherein each of the first and second grippers comprises a slot and a tightening element disposed through the slot, wherein each of the first and second grippers are configured to become tighter or looser on the first rod via the tightening element.

4. The bracket and mount apparatus of claim 1 wherein the rod has a first terminal end and a second terminal end, wherein on the first terminal end is a first flat mounting surface and on the second terminal end is a second flat mounting surface, wherein the first and second flat mounting surfaces on the rod are configured to contact a mounting tab extending from the display.

5. The bracket and mount apparatus of claim 1 further comprising:
    a cable holder configured to hold a cable extending from the display.

6. The bracket and mount apparatus of claim 1 further comprising:
    a second aperture disposed in the flat mounting surface of the arm.

7. The bracket and mount apparatus of claim 6 wherein the first aperture is disposed on a first side of a center of the flat mounting surface of the arm, and the second aperture is disposed on a second side of the center of the flat mounting surface of the arm.

8. The bracket and mount apparatus of claim 1 wherein the second rod is a bolt.

9. The bracket and mount apparatus of claim 8 wherein the bolt comprises a nut, wherein a tension of rotation of the bolt is configured to be adjustable by loosening or tightening the nut on the bolt.

10. The bracket and mount apparatus of claim 1 further comprising:
a slidable washer disposed between the base element and the flat mounting surface of the arm.

11. A system for mounting a touch screen display to a dashboard of a Tesla vehicle, the system comprising:
a vehicle;
a display; and
the bracket and mount apparatus of claim 1 disposed between the vehicle and the display.

12. The system of claim 11 wherein the display is attached to the first rod, wherein the display is configured to be tilted via rotation of the first rod within the first and second grippers.

13. The system of claim 11 wherein the vehicle is attached to the arm of the bracket and mount apparatus of claim 1.

14. A method of using a bracket and mount apparatus for mounting a display to a vehicle comprising the steps of:
providing a bracket and mount apparatus comprising: a first portion comprising a base element having a first gripper and a second gripper extending therefrom, the first gripper comprising a first central bore and the second gripper comprising a second central bore, and a first rod extending through the first and second central bores of the first and second grippers, respectively, the first rod comprising mounting surfaces configured to mount to a display of a vehicle, wherein the first rod forms a first axis of rotation when rotated within the first and second grippers; a second portion comprising an arm having a first terminal end configured to mount to a mounting element on a dashboard of a vehicle, the arm having a second terminal end comprising a flat mounting surface; and a second rod disposed through the base element and a first aperture within the flat mounting surface, wherein the second rod forms a second axis of rotation perpendicular to the first axis of rotation; and
mounting the bracket and mount apparatus to a dashboard of a vehicle; and
mounting the bracket and mount apparatus to a display.

15. The method of claim 14 wherein the bracket and mount apparatus is attached to the dashboard of the vehicle by the arm.

16. The method of claim 14 wherein the bracket and mount apparatus is attached to the display by the first rod.

17. The method of claim 14 wherein each of the first and second grippers comprises a slot and a tightening element disposed through the slot, wherein each of the first and second grippers are configured to become tighter or looser on the first rod via the tightening element, wherein the display is tiltable via rotation of the first rod within the first and second grippers.

18. The method of claim 14 wherein the rod has a first terminal end and a second terminal end, wherein on the first terminal end is a first flat mounting surface and on the second terminal end is a second flat mounting surface, wherein the first and second flat mounting surfaces on the rod are attached to a mounting tab extending from the display.

19. The method of claim 14 wherein the flat mounting surface of the arm comprises a second aperture disposed in the flat mounting surface of the arm.

20. The method of claim 19 wherein the first aperture is disposed on a first side of a center of the flat mounting surface of the arm, and the second aperture is disposed on a second side of the center of the flat mounting surface of the arm, further comprising the steps of:
removing the base element from the first aperture of the flat mounting surface of the arm; and
connecting the base element to the second aperture of the flat mounting surface of the arm.

* * * * *